Patented Apr. 24, 1951

2,550,439

UNITED STATES PATENT OFFICE 2,550,439

PRODUCTION OF UNSATURATED ORGANIC COMPOUNDS

Robert L. Adelman, Niagara Falls, N. Y., assignor to E. I. du Pont de Nemours and Company, Wilmington, Del., a corporation of Delaware No Drawing. Application January 20, 1950, Serial No. 139,792

4 Claims. (Cl. 260—483)

This invention relates to the production of unsaturated organic compounds and has for an object the production of certain vinyl and ethylidene compounds.

I have discovered that certain organic compounds having labile hydrogen atoms may be reacted with vinyl esters to produce vinyl compounds and ethylidene compounds, in which the vinyl or ethylidene radical replaces the labile hydrogen atom.

The invention is illustrated by the following examples:

Example 1

To a flask fitted with a stirrer and reflux condenser is added in the following order, with stirring, 260 g. (2 moles) ethyl acetoacetate (distilled), 1032 g. (12 moles) vinyl acetate (distilled), 5.2 g. (.5%) mercuric acetate reagent, 0.01 g. copper resinate, and 2.6 g. (1%) sulfuric acid. After 15 minutes, an homogeneous solution resulted, and 15% of the theoretical quantity of acetic acid had formed in the solution. This was determined by titrating an aliquot to a pH of 7.0. After heating to reflux for 2 hrs., 40% of theoretical quantity of acetic acid had formed. Heating to reflux was continued for 14 hrs., after which time most of the acetic acid formed in the primary reaction was removed in the formation of ethylidene diacetate. Six grams of sodium acetate were added to neutralize the catalyst, and the excess vinyl acetate and remaining acetic acid was removed under reduced pressures. The residual liquid was distilled rapidly through a 1-foot packed column. After collecting ethylidene diacetate plus recovered acetoacetic ester, there was obtained 102 g., B. P. 70–75°/3 mm., $n_D^{26}=1.4440$ and 90 g., B. P. 76°/3 mm., $n_D^{25}=1.4492$, $d_{20}=1.027$, which rapidly absorbs bromine in carbon tetrachloride. The latter fraction is pure ethylidene acetoacetic ester, and the approximate total conversion is 70–75%. Sixty grams of higher condensation products remained as residue.

Example 2

130 g. (.8 mole) malonic ester, 516 g. (6 moles) vinyl acetate, 3.2 g. mercuric acetate, .05 g. copper resinate, and 1.6 g. sulfuric acid were added in order, with stirring, at 20° C. to a reaction flask and heated to reflux for 14 hrs. Over this time period the acetic acid present dropped from .4 mole to .2 mole. The catalyst was deactivated with the addition of 5 grams sodium acetate, the solution filtered, and distilled under reduced pressure. After removal of unchanged vinyl acetate and acetic acid, 236 g. residual liquid remained. On fractional distillation under vacuum, there was obtained 153 g., B. P. 53°–59°/3 mm., and 57 g., B. P. 59°–60°/2½ mm. These fractions were highly unsaturated, as indicated by rapid reactions with bromine in carbon tetrachloride, and 1% aqueous potassium permanganate, the higher boiling fraction slowly polymerizes to a low polymer with 3% benzoyl peroxide, and decomposes in alkali with the formation of an acetaldehyde polymer. Infra red spectra examination showed that the unsaturated product was a mixture of vinyl malonic ester and ethylidene malonic ester.

Example 3

10 g. (.1 mole) acetyl acetone, 52 g. (.6 mole) vinyl acetate, .001 g. copper resinate, .3 g. mercuric acetate, and 2 drops sulfuric acid were added in order to a flask at —25° C. After 60 hrs. at 25° C., .035 mole acetic acid was formed and after 108 hrs., .06 mole acetic acid was formed, showing that the reaction occurred slowly with the formation of unsaturated products.

Compounds which thus react with vinyl acetate or other vinyl esters to produce ethylidene compounds are characterized by having in the molecule a hydrogen atom which may be replaced with an alkali metal atom when the compound is reacted with an alkali metal alcoholate, said hydrogen atom being linked directly with a carbon atom, which in turn is linked to at least two radicals, either or both of which are one of the following: acyl (RCO—), ester group radical (RO—CO—), formamyl (NH₂—CO—) and cyano (CN—) wherein R is an organic radical. Further, these compounds are characterized by the following type formula:

wherein X and Y are radicals selected from the group acyl, ester group, formamyl and cyano and Z is a radical selected from the group hydrogen and alkyl. Examples of such compounds are malonic esters, monoalkyl malonic esters, acetoacetic esters, monoalkyl acetoacetic esters, acetyl acetone and cyano acetic esters.

Any of the vinyl esters may be utilized in practicing my invention, for example, vinyl formate, vinyl acetate, vinyl propionate, vinyl butyrate, vinyl laurate, vinyl stearate, divinyl adipate, vinyl benzoate, vinyl napththylate, vinyl phthalate and the like. Vinyl acetate is the preferred vinyl ester because of its relative cheapness and availability.

It is essential to use a catalyst in carrying out the reaction. The catalyst used is a mercuric salt of a strong acid, such as mercuric sulfate, mercuric phosphate, or mercuric oxide-boron fluoride complexes. It is preferred to prepare the mercuric sulfate in situ (as, for example, from mercuric acetate or oxide and sulfuric acid), as the catalyst thus made dissolves more readily in the reaction medium and is considerably more reactive than the preformed catalyst. The amount of catalyst should be at least 0.1% of the weight of the compound reacted with the vinyl ester; generally I prefer to use 1 to 10% of said weight.

Inhibitors, such as hydroquinone, copper acetate, or copper resinate, may be added to prevent polymerization of the vinyl esters or the unsaturated reaction product formed during the reaction. These inhibitors do not significantly interfere with the reaction.

The temperature of the reaction may be from 0° C. to 80° C. (reflux temperature). Lower temperatures than 0° C. may be used for unstable products, but reaction rates then are too slow to be practicable. Furthermore, at reflux temperature with an excess of vinyl acetate present, ethylidene diacetate formation (by reaction of vinyl ester with acetic acid) is encouraged, which removes one of the products of reaction (acetic acid) and thus helps to drive the primary reaction to completion.

The speed of reaction may vary widely from around 100 hrs. at 30° C. to 3 hrs. at 76° C.

When the reaction has been effected, the catalyst is deactivated by the addition of an alkaline-reacting material, such as sodium acetate, sodium carbonate, or an organic base, the products separated by extraction or distillation and purified by the usual techniques.

If desired various solvents or diluents may be used in the reaction mixture, for example, benzene, toluene and other aromatic hydrocarbon solvents, acetic acid and the like. However, I generally prefer to carry out the reaction without the aid of solvents.

Vinyl compounds are the products of my invention when the compound reacted with the vinyl ester has the formula:

where X and Y have the meanings given above. When said compound has the formula:

the reaction products are ethylidene compounds.

The formation of the vinyl and ethylidene compounds may be explained by the assumption that the labile hydrogen atom originally is replaced with a vinyl group, setting free the acid of the vinyl ester, e. g., acetic acid, followed by rearrangement of the resulting vinyl derivative to produce the ethylidene compound, as follows:

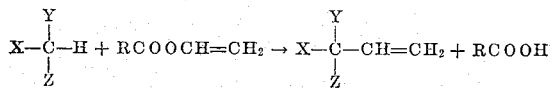

When Z is hydrogen, the vinyl derivative tends to undergo rearrangement to form the ethylidene compound, thus:

When Z is alkyl, the rearrangement cannot occur and the product is the vinyl derivative. For example, the reactions of vinyl acetate with acetoacetic ester and methyl acetoacetic ester, respectively are:

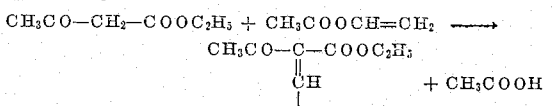

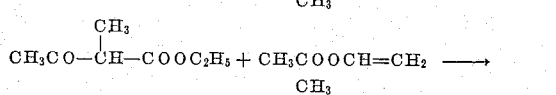

I claim:

1. The process which comprises reacting a vinyl ester in the presence of a mercuric salt of a strong acid with an organic compound having the group —CH, which compound is capable of reacting with an alkali metal alcoholate to replace the hydrogen atom of said group with alkali metal.

2. The process which comprises reacting a vinyl ester with an acetoacetic ester in the presence of a mercuric salt of a strong acid.

3. The process which comprises reacting vinyl acetate with acetoacetic ethyl ester in the presence of a mercuric salt of a strong acid.

4. The process which comprises reacting vinyl acetate with a malonic ester in the presence of a mercuric salt of a strong acid.

ROBERT L. ADELMAN.

No references cited.